(12) United States Patent
Buron et al.

(10) Patent No.: US 9,219,788 B1
(45) Date of Patent: Dec. 22, 2015

(54) ONLINE RESOURCE SERVING TO A TRAVELING USER

(71) Applicant: GOOGLE INC., Mountain View, CA (US)

(72) Inventors: Florian Buron, Zurich (CH); Hristo Stefanov Stefanov, Mountain View, CA (US); Reto Strobl, Walenstadt (CH); Steven George Dropsho, Zurich (CH); Ralitsa Lyudmilova Angelova, Zurich (CH)

(73) Assignee: Google Inc., Mountain View, CA (US)

( * ) Notice: Subject to any disclaimer, the term of this patent is extended or adjusted under 35 U.S.C. 154(b) by 17 days.

(21) Appl. No.: 14/150,238

(22) Filed: Jan. 8, 2014

Related U.S. Application Data

(60) Provisional application No. 61/861,270, filed on Aug. 1, 2013.

(51) Int. Cl.
*G06Q 30/00* (2012.01)
*H04L 29/08* (2006.01)
*G06Q 30/02* (2012.01)

(52) U.S. Cl.
CPC ............ *H04L 67/18* (2013.01); *G06Q 30/0261* (2013.01)

(58) Field of Classification Search
CPC .................................................. G06Q 30/0261
See application file for complete search history.

(56) References Cited

U.S. PATENT DOCUMENTS

| | | | |
|---|---|---|---|
| 7,260,474 B1 * | 8/2007 | Thayathil et al. ............. | 701/428 |
| 7,848,764 B2 | 12/2010 | Riise et al. | |
| 8,073,460 B1 | 12/2011 | Scofield et al. | |
| 8,190,194 B2 | 5/2012 | Brisebois | |
| 8,428,616 B2 | 4/2013 | Robbins et al. | |
| 2005/0119824 A1 * | 6/2005 | Rasmussen et al. .......... | 701/200 |
| 2007/0050253 A1 | 3/2007 | Biggs et al. | |
| 2008/0125959 A1 | 5/2008 | Doherty et al. | |
| 2009/0177484 A1 * | 7/2009 | Davis et al. ..................... | 705/1 |
| 2009/0254824 A1 | 10/2009 | Singh | |
| 2010/0121716 A1 | 5/2010 | Golan | |
| 2010/0223135 A1 | 9/2010 | Griffin et al. | |
| 2011/0099046 A1 | 4/2011 | Weiss et al. | |
| 2011/0099047 A1 | 4/2011 | Weiss et al. | |
| 2011/0223895 A1 * | 9/2011 | Wagda et al. ............... | 455/414.2 |
| 2012/0078721 A1 | 3/2012 | Dakka et al. | |
| 2012/0100869 A1 | 4/2012 | Liang et al. | |
| 2012/0214510 A1 | 8/2012 | Brisebois | |
| 2013/0102283 A1 | 4/2013 | Lau et al. | |

FOREIGN PATENT DOCUMENTS

WO 2008052356 A1 5/2008

* cited by examiner

*Primary Examiner* — John G Weiss
*Assistant Examiner* — Scott C Anderson
(74) *Attorney, Agent, or Firm* — Armstrong Teasdale LLP

(57) ABSTRACT

Methods and systems for serving at least one online resource item to a user based on a state of the user are provided. A host computing device in communication with a memory receives data representing a record of movements of a user device. A user device profile associates locations of the user device with points in time, and with a state of a user. Following receipt of a resource request from the user device, a state of the user is determined. After at least one candidate online resource item responsive to the resource request are received, at least one online resource item relevant to the state of the user is identified and served to the user device.

23 Claims, 5 Drawing Sheets

ONLINE RESOURCE SERVING TO A TRAVELING USER

CROSS-REFERENCE TO RELATED APPLICATIONS

This application claims priority to Provisional Patent Application No. 61/861,270, filed Aug. 1, 2013, which is hereby incorporated by reference in its entirety.

BACKGROUND

This description relates to presenting online resources to users, and more particularly, to network-based methods and systems for determining a state of travel for a user, and providing online resource items to the user based on the determined user state, wherein the user state indicates at least whether the user is traveling within the user's typical travel pattern, or the user is traveling outside of the user's typical travel pattern.

The Internet provides access to a wide variety of resources. Resource items accessible through the Internet include, but are not limited to, image files, video files, audio files and web pages (also collectively referred to as "publications"). The providers of publications are referred to as "publishers." In some situations, access to these resources presents opportunities for presentation of additional resource items ("content" or "online content") from third-party content providers. For example, a web page published by a particular publisher may include content item slots in which content items from other content providers, such as presentations of items for download or purchase, may be presented with the publisher's content.

It is in the interest of both publishers and content providers to provide resources that are generally responsive to a query from a user device, and to provide resources that are specifically relevant to a user with respect to the user's circumstances at the point in time that the query is received. Accordingly, it is desirable to provide resources to a user that are relevant to the user state, wherein the user state involves considerations such as the location of the user at the point in time at which the query is received, and the purpose or reason that causes the user to be at the particular location at the specific point in time.

BRIEF DESCRIPTION OF EXAMPLE EMBODIMENTS

In one aspect, a computer-implemented method for serving an online resource item to a user device based at least in part on a state of the user is provided. The method is implemented using a host computing device in communication with a memory. The method includes receiving, at the host computing device, movement data from a user device, wherein the movement data represents a record of movement of the user device over a period of time, and wherein the movement data includes location data and time data. The method also includes generating, by the host computing device, a user device profile for the user device based on the movement data, the user device profile including data associating locations of the user device with points in time, wherein the associated locations and points in time are further associated with at least one of a plurality of predefined states of the user. The method also includes storing the user device profile within the memory. The method also includes receiving, by the host computing device, a resource request associated with the user device. The method also includes determining, by the host computing device, a state of the user based at least in part on the user device profile. The method also includes receiving at least one candidate online resource item responsive to the resource request, identifying from the at least one candidate online resource item at least one online resource item that is relevant to the user state, and serving, from the host computing device, the identified online resource item relevant to the user state to the user device.

In another aspect, a computer system for serving an online resource item to a user device based at least in part on a state of the user is provided. The computer system includes a processor, and a computer-readable storage device having encoded thereon computer-readable instructions that are executable by the processor. The computer-readable instructions cause the processor to receive movement data from a user device, wherein the movement data represents a record of movement of the user device over a period of time, and the movement data includes location data and time data. The processor generates a user device profile for the user device based on the movement data, the user device profile including data associating locations of the user device with points in time, wherein the associated locations and points in time are further associated with at least one of a plurality of predefined states of the user. The processor is configured to store the user device profile within a memory, receive a resource request associated with the user device, and determine a state of the user based at least in part on the user profile. The processor is also configured to receive at least one candidate online resource item responsive to the resource request, identify from the at least one candidate online resource item at least one online resource item from the search results that is relevant to the user state, and serve the identified online resource item relevant to the user state to the user device.

In still another aspect, computer-readable storage media having computer-executable instructions thereon for serving an online resource item to a user device based at least in part on a state of the user are provided. When executed by at least one processor, the computer-executable instructions cause the at least one processor to receive movement data from a user device, wherein the movement data represents a record of movement of the user device over a period of time, and the movement data includes location data and time data. The at least one processor generates a user device profile for the user device based on the movement data, wherein the user device profile includes data associating locations of the user device with points in time, and wherein the associated locations and points in time are further associated with at least one of a plurality of predefined states of the user. The computer instructions further cause the at least one processor to store the user device profile within a memory, receive a resource request associated with the user device, determine a state of the user based at least in part on the user device profile, receive at least one candidate online resource item that is responsive to the resource request, identify from the at least one candidate online resource item at least one online resource item that is relevant to the user state, and serve the identified online resource item relevant to the user state to the user device.

The features, functions, and advantages described herein may be achieved independently in various embodiments of the present disclosure or may be combined in yet other embodiments, further details of which may be seen with reference to the following description and drawings.

Figure 1:
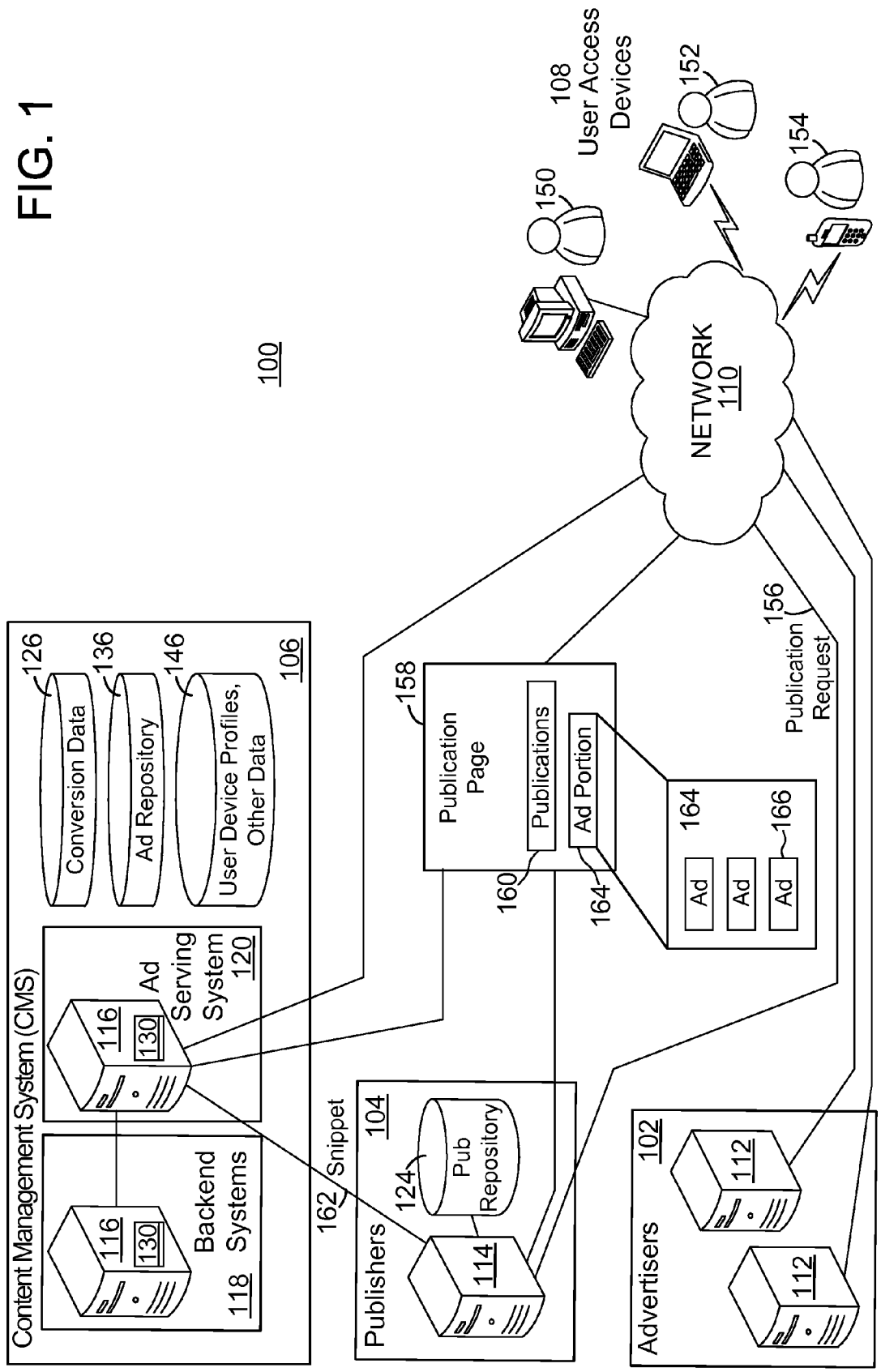
FIG. 1 is a block diagram depicting an example online resource environment.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of various implementations refers to the accompanying drawings. The same reference numbers in different drawings may identify the same or similar elements. Also, the following detailed description of various implementations does not limit the claimed subject matter.

As used herein, the terms "resources" and "online resources" refer to materials accessible through the Internet that include publications and other online content. As used herein, the term "publications" refers to, for example, image files, video files, audio files, and web pages. As used herein, the terms "content" and "online content" refer to online advertisements. Online content may be served to an online user in association with search results served in direct response to a search query submitted by a user. Alternatively, online content may be served independently of a specific set of search results, or even independently of any search query submitted by a user via a user access device.

The subject matter described herein relates generally to serving online resource items (publications and/or online advertising) to a user. Specifically, the methods and systems described herein enable a computer-based system, such as a Content Management System ("CMS"), to present online resource items, such as publications and advertisements, to a user device. The CMS includes at least one host computing device in communication with a memory. The online resource items may be served in direct response to a search query submitted by a user via the user device. A search query submitted by a user may produce numerous search results that vary with respect to the needs of the user that prompted the submission of the query. Some results may be of general utility or relevance to the user, while other results may address the user's needs with greater precision or relevance. Frequently, the query as submitted by the user does not include information that reveals the user's specific needs at the time of submission of the query. A user's needs may vary depending upon the location of the user and the purpose for the user being at that location. For example, when an advertisement is served via the host computing device, an advertisement for a hotel may be less relevant to a user who resides in the vicinity of the hotel, than it would be to a user that happens to be within a predefined distance from the hotel and is presently traveling from their home. Conversely, an advertisement for a business or service that typically caters to local residents, such as a dentist, is typically more relevant to local residents than it would be to a vacation traveler.

The methods and systems described herein also relate to serving of online resource items other than in direct response to a search query submitted by a user via a user access device. For example, a user may access a news website that serves a news feed, without specifically submitting a search query to locate the website. The CMS, via the at least one host computing device, can identify both news items, as well as online content (advertisements) to be served alongside news items, that are relevant to a user and take into account the present user state at the time the news items and/or advertisements are served. For example, the at least one host computing device may serve news items relating to weather events and/or travel service interruptions to a user device that has been identified as being in a travel state.

Accordingly, the methods and systems described herein relate to serving relevant online resource items to a user device, taking into account the state of the user, without regard to whether the online resource items are being served in response to a search query submitted by a user access device. The relevant online resource items include, but are not limited to, one or more of search results responsive to a user query, advertisements contained within search results, advertisements served alongside of other online resource items (such as videos accessed via a video viewing platform) on any website, including sponsored websites, and/or publications, advertisements, and/or other online resource items served to a user independently of a search query submitted by a user. Generally stated, the methods and systems described herein relate to improving the relevance of online resource items, whether ads and/or publications, that are served to a user access device from any website or other online location, such that online services are provided to a user that are tailored (personalized) to the state of the user receiving the online services.

The methods and systems described herein enable the CMS, via the at least one host computing device, to generate a user device profile including a record of past movements of the user device relative to points in time. This, in turn, enables the at least one host computing device to generate and store, in the memory, at least one predetermined typical travel pattern, and identify atypical travel patterns. Typical travel patterns identified by the at least one host computing device and stored in the memory may include personal local travel patterns (such as to retail establishments), work travel patterns (such as commuting); and personal medium- or long-distance travel patterns (such as vacation trips to regularly-visited destinations). The CMS, via the at least one host computing device, is then able to present online resource items (i.e., publications and advertisements) that are generally responsive to the submitted query. In addition, the methods and systems described herein also enable online resource items to be presented to a user that are relevant to a state of the user, specifically, a particular state of the user at the point in time of submission of the query, or at least at the point in time of service of the at least one online resource item to the user access device.

"State of the user" or "user state," as used herein, refers to contextual aspects regarding the user's query, such as, but not limited to, the location of the user device from which the query was submitted. In addition, "state of the user" can refer to a reason or purpose for the user device to be present at the specific location. Moreover, "state of the user" can refer to a literal "state of mind" of the user. For example, the "state of the user" may refer to whether the user is traveling from home, and whether the travel is vacation- or work-related. In one aspect, a state of the user may be a "current" state, with respect to a particular point in time, and a corresponding location of the user access device at that point in time. In another aspect, a "recurring state of the user" may refer to a particular pattern of movements or other behavior that corresponds to a particular type of activity in which a user may engage, such as skiing (as suggested by frequent trips to a ski resort area), or other recreational activities. Another recurring state of a user may be frequent flying activity, or frequent travelling activity, generally. The foregoing considerations facilitate the identification, selection, and presentation of online resource items (e.g., publications and advertisements) that are responsive to the submitted query, and also address present preferences or requirements of the user at the time of submission of a query.

In one embodiment, the CMS is also known as an Advertisement Management System ("AMS"). The methods and systems described herein can enable the CMS, via the at least one host computing device, to identify and select items of online content (e.g., advertisements), based on search results received from a user query in combination with a determined state of the user.

In an example embodiment, the methods and systems described herein enable the CMS, via the at least one host computing device, to provide information of particular relevance to the state of the user, such as driving directions to a destination embodied in search results received in response to a user search query. In addition, if the user selects the driving directions provided with online content, a signal may be sent to the CMS indicating the user's interest in the online content.

Moreover, the methods and systems described herein enable the CMS, via the at least one host computing device, to use location data received by a user device to compare movements of the user device after receipt of at least one resource item to a location embodied in the at least one resource item. This enables the at least one host computing device to generate a feedback signal representative of a level of correspondence between the record of movements and the location embodiment in the at least one resource item. In this manner, a measure of the relevance of the at least one resource item served to the user device is provided.

The methods and systems herein further enable the CMS, via the at least one host computing device, to determine relevant information regarding the user device to facilitate presenting relevant online resource items to the user device. Such relevant information may include, but is not limited to, the language used by the user device (and therefore the user).

In addition, the methods and systems described herein enable the CMS, via the at least one host computing device, to receive location data from a plurality of sources, including IP addresses, GPS data, Wi-Fi signal strength, cell tower signal strength, and telecommunications triangulation data. The host computing device may also receive location data from other online resources, such as email platforms, and platforms that provide other services, such as maps, driving instructions, sources for still image, audio and video files, and the like.

In the example embodiment, the CMS uses a computer-implemented method for providing online resource items (e.g., publications and online content) to a user based on a state of the user. The method is implemented by the CMS using a host computing device, within the CMS, that is in communication with a memory. The host computing device receives movement data from a user device, the movement data representing a record of movement of the user device over a period of time, the movement data including location data and time data. The host computing device generates a user device profile for the user device based on the movement data. The user device profile includes data associating locations of the user device with points in time, wherein the associated locations and points in time are further associated with at least one of a plurality of predefined states of the user. In other words, the user device profile includes a plurality of locations and corresponding times when that user was in a given location, such that the user device profile includes a typical travel pattern of the user device over a period of time, and an atypical travel pattern of the user device over the same period of time. The host computing device stores the user device profile within the memory. The user access device profile is stored within one or both of a user access device and the memory in communication with the host computing device. The host computing device receives a resource request submitted by the user device and determines a state of the user from at least one of a determined current location of the user device and the user device profile. The host computing device receives at least one candidate online resource item responsive to the resource request, and identifies at least one online resource item from the at least one candidate online resource item that is relevant to the state of the user and serves the identified online resource item relevant to the state of the user to the user device. In the example embodiment, the host computing device serves the identified online resource item through one at least one of a video viewing platform, a search platform, an email platform, a news feed platform, and/or a map serving platform.

In the example embodiment, the host computing device receives data representing travels of the user device after service of an online resource item, such as an advertisement. The host computing device compares the travel data to destination or travel information contained in the advertisement. If the comparison by the host computing device indicates that the user device traveled to a destination mentioned in the advertisement, the host computing device generates a feedback signal indicating the user's interest in the advertisement indicated by the user device having traveled to the destination in the advertisement.

In the example embodiment, the at least one online resource item is one of a publication, and an advertisement. More specifically, the CMS, via the host computing device, may serve general information responsive to a user search query. Alternatively, the host computing device may serve a specific publication responsive to a user search query. The host computing device may also serve an online resource item to a user independently of a user search query. The host computing device may also serve at least one of travel directions and a map to a destination specifically requested by a user. The host computing device may also serve a destination suggestion to the user device.

In the example embodiment, the host computing device stores the user device profile within memory within the user device. Alternatively, the host computing device stores the user device profile within the memory in communication with the host computing device. Also in the example embodiment, the user device is at least one of a mobile device and a non-mobile computing device.

In the example embodiment, the host computing device receives location data regarding the user device via at least one of an IP address, GPS data, Wi-Fi signal strength, cell tower signal strength, and/or telecommunications triangulation data. The host computing device also derives location data from email data.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented by a host computing device in communication with a memory, using computer programming or engineering techniques including computer software, firmware, hardware or any combination or subset thereof, wherein the technical effects are achieved by performing at least one of the following steps: (a) receiving, at the host computing device, movement data from a user device, wherein the movement data represents a record of movement of the user device over a period of time, and wherein the movement data includes location data and time data; (b) generating, by the host computing device, a user device profile for the user device based on the movement data, the user device profile including data associating locations of the user device with points in time, wherein the associated locations and points in time are further associated with at least one of a plurality of predefined states of the user, and wherein the user device profile includes at least one typical travel pattern and at least one atypical travel pattern; (c) storing the user device profile within at least one of the memory in communication with the host computing device and a memory in the user device; (d) receiving, at the host computing device, a resource request associated with the user device; (e) determining, by the host computing device, a state of the user from at least one of a determined current location of the user device and the user device profile; (f) receiving, at the host computing device, at least one candidate online resource item responsive to the resource request; (g) identifying, by the host computing device, at least one online resource item, from at least one candidate online resource item, that is relevant to the state of the user; and (h) serving the identified at least one online resource item relevant to the state of the user to the user device, wherein the identified at least one online resource item is at least one of a publication and an advertisement.

The technical effects may also be achieved by performing at least one of the following steps: (a) serving, by the host computing device, general information responsive to a user search query and relevant to the state of the user; (b) serving, by the host computing device, a specific publication responsive to a user search query and relevant to the state of the user; (c) serving, by the host computing device, an online resource item to a user independently of a user search query and relevant to the state of the user; (d) serving, by the host computing device, at least one of travel directions and a map to a destination specifically requested by a user and relevant to the state of the user; (e) serving, by the host computing device, a destination suggestion that is relevant to the state of the user; (f) serving, by the host computing device, the at least one online resource item through one of, but not limited to, a video viewing platform, a search platform, an email platform, a news feed platform, and/or a map serving platform that is relevant to the state of the user; (g) receiving, at the host computing device, data representing a record of movements of a user device after service of the identified at least one online resource item relevant to the state of the user; (h) comparing, with the host computing device, the record of movements after service of the identified at least one online resource item to a location embodied in the served at least one online resource item; (i) generating, by the host computing device, a feedback signal representative of a level of correspondence between the record of movements after service of the served at least one online resource item and the location embodied in the at least one online resource item; (j) determining, by the host computing device, whether the level of correspondence exceeds a predetermined level; (k) generating, by the host computing device, a conversion message that contains data representing at least the online resource item, if the level of correspondence exceeds the predetermined level; (l) receiving, by the host computing device, data representing a request for driving directions to a destination associated with the advertisement; (m) generating, by the host computing device, a conversion message that contains the data representing the driving directions request; (n) transmitting the conversion message to an advertiser; (n) receiving, at the host computing device, location data regarding the user device via at least one of an IP address, GPS data, Wi-Fi signal strength, cell tower signal strength, and/or telecommunications triangulation data; and (o) deriving location data from email data.

FIG. 1 is a diagram depicting an example networked environment. With reference to FIG. 1, an example networked environment 100 may include one or more content providers (e.g., advertisers) 102, one or more publishers 104, a content management system (CMS) 106 (also referred to as advertising management system or "AMS 106" in FIG. 2), and one or more user access devices 108 ("client computing devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network.

In the example embodiment, content providers 102 include one or more advertisers 102, such that elements 102, 104, 106 and 110 may serve, for example, as an advertisement distribution network. While reference is made to distributing advertisements, the environment 100 can be suitable for distributing other forms of content including other forms of sponsored content, including publications as described herein. Content providers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to or include sponsored content.

Ads may be communicated via various media and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

Similarly, publications may be communicated via various mediums and in various forms. In some examples, publications may be communicated through an interactive medium, such as the Internet, and may include graphical content (e.g., banner content), textual content, image content, audio content, video content, content combining one of more of any of such components (i.e., a "publication item combination"), or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/ or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from CMS 106 and may be combined with a publication for display to users 150, 152, and/or 154. In some examples, the publishers 104 may retrieve a publication for display on a particular user access device 108 and then forward the publication to the user access device 108 along with code that causes content from CMS 106 to be displayed to the users 150, 152, or 154. In other examples, the publishers 104 may retrieve a publication, retrieve relevant content (e.g., from CMS 106 or the content providers 102), and then integrate the content and the publication to form a page for display to the users 150, 152, and/or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

CMS 106 manages content and provides various services to the content providers 102, the publishers 104, and the user access devices 108. CMS 106 may store content in a publication repository 124 and facilitate the distribution or selective provision and recommendation of content through the environment 100 to the user access devices 108. User access devices 108 may also store on board user device profiles that include information regarding movements of user access devices 108, as described in further detail hereinbelow.

CMS 106 may include one or more data processing systems 116, such as servers or embedded systems, coupled to the network 110. In the example embodiment, any of data processing systems 116 may include a host computing device 130, through which CMS 106 may perform any of the functions described herein. Any of data processing systems 116 may also include one or more processors, such as server processors. In some examples, CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. CMS 106 can use the backend processing systems 118 and the content serving system 120 to selectively recommend and provide relevant content from the content providers 102 through the publishers 104 to the user access devices 108.

CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

CMS 106 may include one or more interface or frontend modules for providing the various features to content providers, publishers, and user access devices. For example, CMS 106 may provide one or more publisher front-end interfaces (PFEs) for allowing publishers to interact with CMS 106. CMS 106 may also provide one or more content provider front-end interfaces (CPFEs) for allowing content providers to interact with CMS 106. In some examples, the front-end interfaces may be configured as web applications that provide users with network access to features available in CMS 106.

CMS 106 provides various content management features to the content providers 102. CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

CMS 106 may allow the content providers 102 to create content and input keywords for which the content will appear. In some examples, CMS 106 may provide content to user access devices or publishers when keywords associated with that content are included in a user request or a requested publication. CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

CMS 106 may also allow the content providers 102 to view information about content impressions, which may be maintained by CMS 106. CMS 106 may be configured to determine and maintain the number of content impressions relative to a particular web page or keyword. CMS 106 may also determine and maintain the number of click-throughs for content as well as the ratio of click-throughs to impressions.

CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). In another example, a conversion could be defined as a type of action taken by a user that can be interpreted as being a response to an advertisement that indicates a predetermined level of interest in the advertisement by a user, such as a user clicking on a link to driving directions provided in an advertisement, or a separate user request for driving directions to a destination described in the advertisement. CMS 106 may store conversion data and other information in a conversion data repository 126.

CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

CMS 106 may provide various features to the publishers 104. CMS 106 may deliver content (associated with the content providers 102) to the user access devices 108 when users access publications from the publishers 104. CMS 106 can be configured to deliver content that is relevant to publisher sites, publications, and publisher audiences.

In some examples, CMS 106 may crawl publications provided by the publishers 104 and deliver content that is relevant to publisher sites, publications and publisher audiences based on the crawled publications. CMS 106 may also selectively recommend and/or provide content based on user information and behavior, such as particular search queries performed on a search engine website. CMS 106 may store such information in a general database 146. General database 146 may also store profiles of user access devices 108, as described in further detail hereinbelow. In some examples, CMS 106 can add search to a publisher site and deliver content configured to provide appropriate and relevant content relative to search results generated by requests from visitors of the publisher site. A combination of these and other approaches can be used to deliver relevant content.

CMS 106 may allow the publishers 104 to search and select specific products and services as well as associated content to be displayed with publications provided by the publishers 104. For example, the publishers 104 may search through content in the ad repository 136 and select certain content for display with their publications.

CMS 106 may be configured to selectively recommend and provide content created by the content providers 102 to the user access devices 108 directly or through the publishers 104. CMS 106 may selectively recommend and provide content to a particular publisher 104 (as described in further detail herein) or a requesting user access device 108 when a user requests search results or loads a publication from the publisher 104.

In some implementations, CMS 106 may manage and process financial transactions among and between elements in the environment 100. For example, CMS 106 may credit accounts associated with the publishers 104 and debit accounts of the content providers 102. These and other transactions may be based on conversion data, impressions information and/or click-through rates received and maintained by CMS 106.

"Computing devices," for example user access devices 108 and/or host computing device 130, may include any devices capable of receiving information from network 110. User access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

FIG. 1 also illustrates aspects of a data flow between advertisers 102, publishers 104, CMS 106, user access devices 108, and network 110. CMS 106 stores ads from the advertisers 102 and receives ad decisions from a particular publisher 104. The ad decisions can include decisions to approve and/or disapprove certain ads and/or advertisers. These ad decisions can be based on aggregated ratings or scores, associated with ads/advertisers that are provided to the publisher 104 by CMS 106. Such aggregated scores can represent ratings of ads/advertisers received from multiple publishers 104.

The publisher 104 may receive a publication request 156 from a particular user access device 108. The publication request 156 may, for example, include a request for a web document on a given topic (e.g., automobiles). In response to the publication request 156, the publisher 104 may retrieve a relevant publication (e.g., an automobile article) from the publication repository 124 or some other source.

The publisher 104 may respond to the publication request 156 by sending a publication page 158 or other presentation to the requesting user access device 108. The publication page 158 may include the requested publication 160 (e.g., the automobile article) as well as a code "snippet" 162 associated with an ad. A code "snippet" refers, for example, to a method used by one device (e.g., a server) to ask another device (e.g., a browser running on a client device) to perform actions after or while downloading information. In some examples, a code "snippet" may be implemented in JAVASCRIPT® code or may be part of HTML (Hypertext Markup Language) or other web page markup language or content.

CMS 106 may provide the code snippet 162 to the publisher 104 and/or the user access device 108. The code snippet can originate and/or be provided from other sources. As the requesting user access device 108 loads the publication page 158, the code snippet 162 causes the user access device 108 to contact CMS 106 and receive additional code (e.g., JAVASCRIPT® or the like), which causes the publication page 158 to load with an ad portion 164.

The ad portion 164 may include any element that allows information to be embedded within the publication page 158. In some examples, the ad portion 164 may be implemented as an HTML element, such an I-Frame (inline frame) or other type of frame. The ad portion 164 may be hosted by CMS 106 or the publisher 104 and may allow content (e.g., ads) from CMS 106 or the publisher 104 to be embedded inside the publication page 158. Parameters associated with the ad portion 164 (e.g., its size and shape) can be specified in the publication page 158 (e.g., in HTML), so that the user access device 108 can present the publication page 158 while the ad portion 164 is being loaded. Other implementations of ad portion 164 may also be used.

The ad portion 164 may send CMS 106 formatting and publication information. The formatting and publication information may include information describing the manner (e.g., how, when, and/or where) in which ads can be rendered by the user access devices 108. The formatting and publication may also include ad attributes and parameters, such as size, shape, color, font, presentation style (e.g., audio, video, graphical, textual, etc.), etc. The formatting and publication information may also specify a quantity of ads desired.

The formatting and publication information can include information associated with the requested publication 160 displayed in publication page 158. Such information may include a URL associated with the requested publication page 158. The formatting and publication information can include the requested publication itself, a category corresponding to the requested publication or the publication request, part or all of the publication request 156, publication age, publication type (e.g., text, graphics, video, audio, mixed media, etc.), geo-location data, and the like.

In response to the formatting and publication information, CMS 106 may provide the user access device 108 with ad information. The ad information may include one or more ads 166 for placement in the ad portion 164 of the publication page 158. The ad information may also include a signed or encoded specification of an ad.

The ad information may include ads that are relevant to user interest. CMS 106 may retrieve and provide relevant ads based on user device information received from the user access device 108. CMS 106 may retrieve the ad information from the ad repository 136 using the backend processing systems 118 (shown in FIG. 1). CMS 106 may retrieve relevant ads using information from a crawling module, various keywords, various statistical associations between ads and publication, and/or preference information associated with the publishers.

CMS 106 may decide whether to serve certain ads with one or more publications based on the ad decision received from the publisher 104. For example, CMS 106 may identify a relevant ad from the ad repository 136 based on keywords but may decide that the ad should not be served with the one or more publications (e.g., the requested automobile document) because the publisher 104 has indicated in the ad decisions a disapproval of the identified ad. In some examples, these ad serving decisions may be based on rules maintained by the backend processing systems 118 (shown in FIG. 1).

The ad portion 164 may populate with ads included in the ad information, such as ads 166. The ad portion 164 and the displayed ads 166 may occupy a portion of the publication page 158, which may be distinct from other publications (e.g., the requested publication 160) in the publication page 158.

When a user clicks on the displayed ad 166, an embedded code snippet may direct the user access device 108 to contact CMS 106. During this event, the user access device 108 may receive an information parcel, such as a signed browser cookie, from CMS 106. This information parcel can include information, such as an identifier of the selected ad 166, an identifier of the publisher 104, and the date/time the ad 166 was selected by the user. The information parcel may facilitate processing of conversion activities or other user transactions.

The user access device 108 may then be redirected to the advertiser 102 associated with the selected ad 166. The user access device 108 may send a request to the associated advertiser 102 and then load a landing page from the advertiser 102. The user may then perform a conversion action at the landing page, such as purchasing a product or service, registering, joining a mailing list, etc. A code snippet, which may be provided by CMS 106, may be included within a conversion confirmation page script, such as a script within a web page presented after the purchase. The user access device 108 may execute the code snippet, which may then contact CMS 106 and report conversion data to CMS 106. The conversion data may include conversion types and numbers as well as information from cookies. The conversion data may be maintained in the conversion data repository 126. CMS 106 may subsequently generate and transmit a conversion data report to one or more of advertisers 102.

Any data flows shown or described herein are shown by way of example only and not intended to be restrictive. Other data flows may therefore occur in the environment 100 and the illustrated events and their particular order in time may vary. Further, the illustrated events may overlap and/or may exist in fewer steps. Moreover, certain events may not be present and additional and/or different events may be included.

Figure 2:
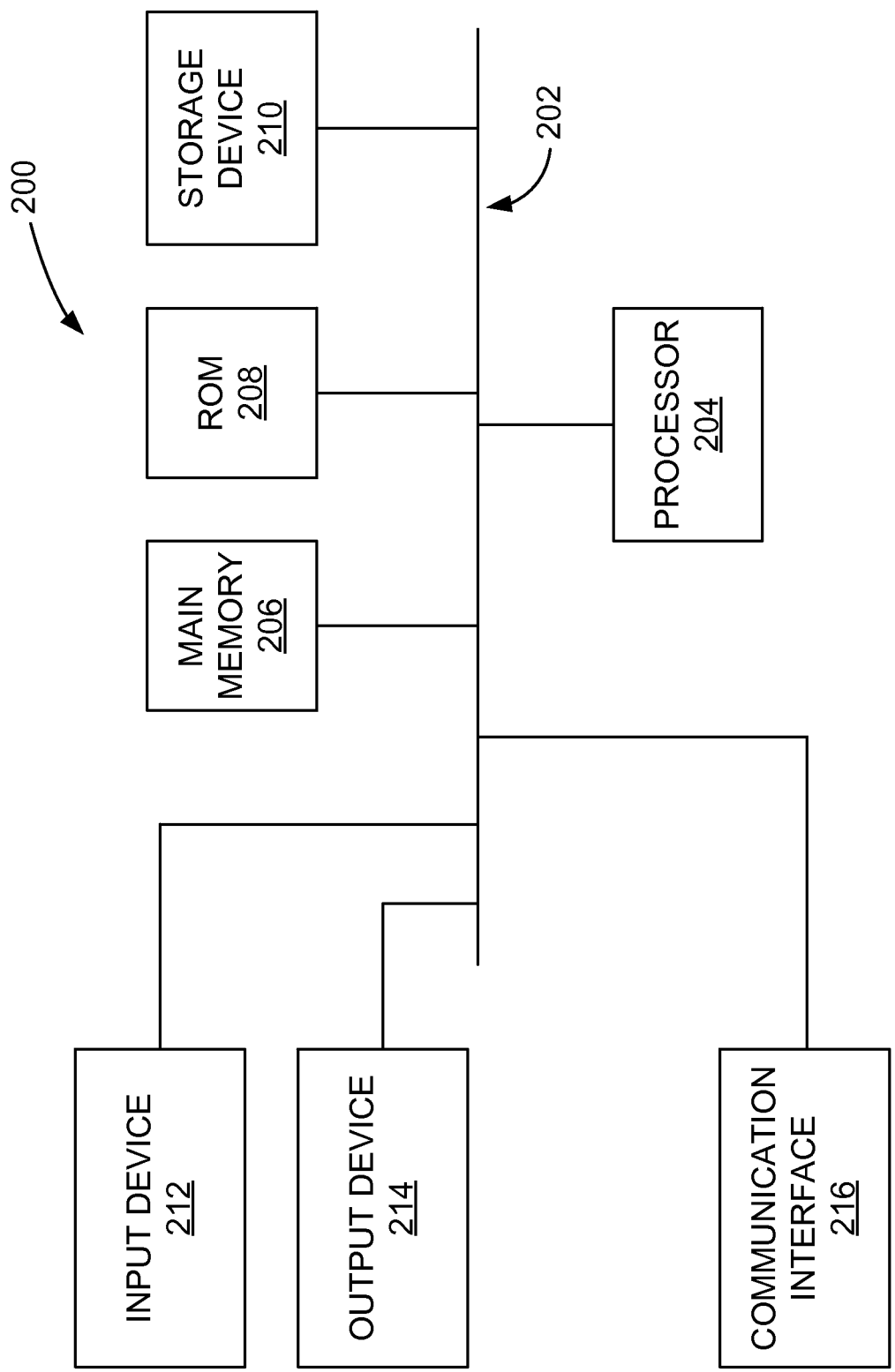
FIG. 2 is a block diagram of an example host computing device, used for delivering online resources to a traveling user, as shown in the environment of FIG. 1.

FIG. 2 is a block diagram of a computing device 200. In the example embodiment, computing device 200 could be host computing device 130 (shown in FIG. 1), configured to provide at least one online resource item, based on a state of a user, to a user access device 108 such as a mobile computing device, as shown in the advertising environment 100 (shown in FIG. 1). FIG. 2 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing systems 112, 114, or 116 (shown in FIG. 1). In addition, computing device 200 could be host computing device 130, wherein it is specifically configured to perform the steps described herein. In the example embodiment where computing device 200 is host computing device 130, computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for computing device 200. In one implementation, the storage device 210 may be or contain a computer-readable medium, such as a floppy disk device, a hard disk device, an optical disk device, or a tape device, a flash memory or other similar solid state memory, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200, operating as host computing device 130, facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Computing device 200 may be implemented in a number of different forms, as shown in the figure. For example, it may be implemented as a standard server, or multiple times in a group of such servers. It may also be implemented as part of a rack server system. In addition, it may be implemented in a personal computing device such as a laptop computer. Each of such devices may contain one or more of host computing devices 200, and an entire system may be made up of multiple host computing devices 200 communicating with each other.

The processor 204 can execute instructions within computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. Computing device 200 may also be provided with a storage device 210, such as a microdrive or other device, to provide additional storage. Each of the components is interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, Wi-Fi, or other such transceiver (not shown). In addition, a GPS (Global Positioning system) receiver module may provide additional navigation- and location-related wireless data to device 200, which may be used as appropriate by applications running on device 200.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location data is obtained (such as to a city, ZIP code, or state level), so that a particular location of a user cannot be determined. Thus, the user may have control over how information is collected about the user and used by a content server.

As described herein, computing device 200, operating as host computing device 130, facilitates serving online resource items, such as publications and online content (e.g., advertisements), to a traveling user that takes into account not only a traveling user's historical travel locations and present location at the time of a content request, but also incorporates a consideration of a traveling user's "state of travel," including but not limited to, whether the user is currently traveling from home, whether the travel is typical travel or atypical travel, and whether the travel is related to business or leisure, at the time of the request for online resources. Computing device 200 may perform these and other operations in response to processor 204 executing software instructions contained in a computer-readable medium, such as memory 206. A computer-readable medium may be defined as a physical or logical memory and/or carrier wave. The software instructions may be read into memory 206 from another computer-readable medium, such as data storage device 210, or from another device via communication interface 216. The software instructions contained in memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
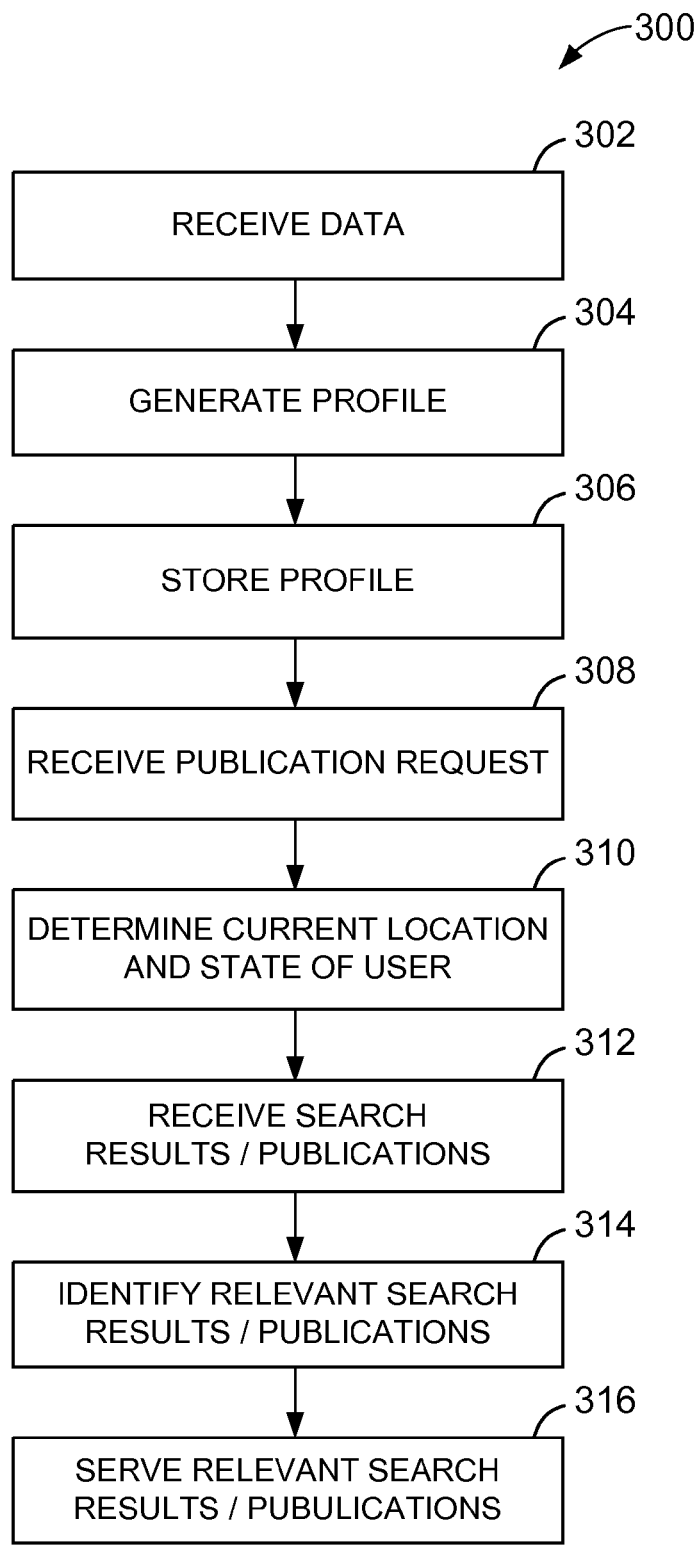
FIG. 3 is a flowchart of an example method for serving search results and publications to a traveling user, via the host computing device shown in FIG. 1.
Figure 4:
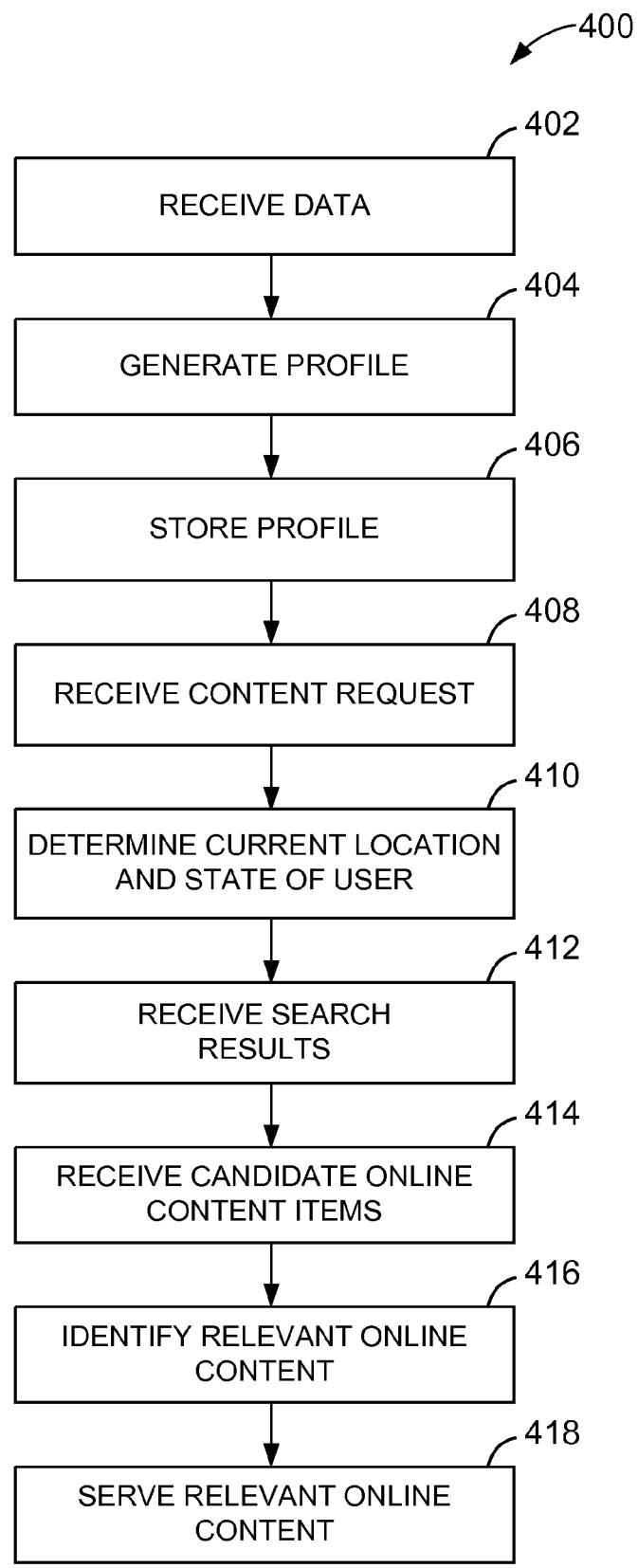
FIG. 4 is a flowchart of an example method for serving online content to traveling users, via the host computing device shown in FIG. 1.

As used herein, an online resource request may be any signal received by host computing device 130 that prompts host computing device 130 to provide to user access device 108 an online resource item. The signal may be a search request received from user access device 108 that prompts a search for a publication (FIG. 3). Alternatively, the signal may be a search request received from user access device 108 that prompts a request for online content resulting in the service of an advertisement (FIG. 4).

In another alternative example embodiment, the signal may be a request for an online resource item received from another source, such as from a publisher 104 (FIG. 1) or self-generated by host computing device 130. An example of a request for online content from another source occurs when a user access device 108 directly accesses a sponsored website without submitting a search request. In this example, ads may be served to user access device 108 not in response to a user-submitted search request, but, for example, from a request for an online resource item (specifically an advertisement) contained in a code snippet 162 (FIG. 1) contained in a publication page 158 (FIG. 1) along with a publication 160. Ads served to user access device 108 other than in response to a search request submitted by user access device 108 include any ad generally presented (e.g., in the side margins, or as a header or footer) in a web page, such as an advertisement served together with video publications served on a video viewing platform. Still another example includes an advertisement served together with a map or driving instructions served on a map serving platform.

FIG. 3 is a flowchart illustrating the steps in an example method 300 for serving relevant search results and publications to traveling users. In the example embodiment, the online resource request may be a general search request such as a request for information regarding restaurants near user access device 108. Method 300 is initiated when host computing device 130 (shown in FIG. 1) of CMS 106 (shown in FIG. 2), receives 302 location data from user access device 108 (shown in FIG. 1) regarding movements of user access device 108. In the example embodiment, such location data is received through several possible means. For example, host computing device 130 may receive IP (Internet Protocol) address information when a search query is received from user access device 108. If user access device 108 is a Wi-Fi equipped device, host computing device 130 may receive data via Wi-Fi signal strength, as well as through IP address information. If user access device 108 is a wireless internet-equipped laptop or a mobile device, in addition to the foregoing, host computing device 130 may receive location data via cellphone tower signal strength and/or triangulation techniques. Moreover, host computing device 130 may receive location data via GPS-equipped user access devices 108. The foregoing examples of how host computing device 130 may receive location data are described as examples only, and in alternative embodiments, any manner of receiving location data can be used that enables method 300 to be performed as described herein.

As host computing device 130 (FIG. 1) receives 302 location data, host computing device 130 also stores the location data, which also includes data regarding points in time associated with geographic locations occupied by user access device 108 (FIG. 1), for example in database 146 (FIG. 1). Host computing device 130 then generates 304 a user device profile and stores 306 the user device profile, for example in database 146. Alternatively, or in addition to database 146, host computing device 130 may store the user device profile within user access device 108, such as in the form of a cookie. By storing the user device profile in cookie form, a user is able to periodically reset or delete the user device profile if desired. In addition, in the example embodiment, host computing device 130 is configured to enable a user to specifically designate certain geographic locations as "home" and/or "work" locations. Moreover, host computing device 130 may be configured to enable a user to disable the user device profile and/or activate limitations on information contained within a user device profile so as to control which information is used by host computing device 130 for purposes of serving online resource information to user access device 108. The user device profile may also be stored on user access device 108. The user device profile not only includes a historical record of locations of user access device 108 correlated to points in time, but also includes additional generated data, such as the frequency with which user access device 108 has traveled to various locations ("trips"), the durations of the stays of user access device 108 during the trips, and the times of day and days of the week associated with the trips. The foregoing generated data items are described by way of example, and the present disclosure is not limited thereto.

Moreover, as host computing device 130 continues to receive location data from user access device 108, and generate 304 the profile of user access device 108, host computing device 130 includes in the profile a set of typical travel locations or destinations, as well as probable states of the user associated with the respective typical travel locations. In other words, host computing device 130 identifies and stores as part of the user device profile, one or more typical travel patterns or states corresponding to user access device 108. In addition, host computing device 130 includes as part of the user device profile, criteria for identifying whether a current travel pattern is typical or atypical, and further for determining whether the current travel pattern is a home or personal (e.g., daily chores) travel pattern, a pleasure (e.g., vacation) travel pattern, or a work-related or business travel pattern. For example, if the user device profile indicates that during evenings, user access device 108 generally stays at one location or generally within a predefined distance of that location, host computing device 130 assigns that location a designation as a "home" location and/or as a typical home travel pattern. Alternatively, if the data reflects regular weekday morning trips to a specific destination, followed by an extended stay for a duration equivalent to a typical workday, in turn followed by a return trip to the home location, host computing device 130 assigns the specific destination a designation as a "work" location, and/or the trip pattern as a typical "work" travel pattern. As another alternative, if the data reflects that user access device 108 on the weekends regularly travels to a medium-distance (e.g., 100 miles or less) destination and returns at the end of the weekend, host computing device 130 assigns that travel pattern a designation such as a regular pleasure trip ("vacation") travel pattern.

The data received by host computing device 130 can include further detailed information regarding locations to which user access device 108 (FIG. 1) travels, depending upon the degree of precision provided by the raw location data. For example, with sufficiently precise location data, host computing device 130 can determine whether a trip destination is a residential area, an industrial area, a business office area, a retail location, and the like. Such additional information is obtainable for example, via host computing device 130 accessing publicly available information sources, such as online address/phone directories (including reverse directories). Depending upon the granularity of the received location data, host computing device 130 may be able to identify specific address locations to which user access device 108 has travelled, and even the name, for example, of a specific retail location, office building, or hotel.

In the example embodiment, host computing device 130 can define states of the user as stored within the user access device profile to any desired degree of granularity. For example, host computing device 130 can store, within a work travel pattern, states that include "commute from home to work" and "commute from work to home" states, inasmuch as the user's needs can differ depending upon the direction of travel and the time of day. A user travelling to work may be interested in publications (or ads) that relate to breakfast food or coffee services (especially carry-out food or beverages), while a user travelling from work to home may be more interested in publications (or ads) that relate to more formal restaurants, retail establishments, and/or entertainment venues and opportunities.

Depending upon the granularity of the received location data, host computing device 130 may be able to identify specific address locations to which user access device 108 has travelled, and even the name, for example, of a specific retail location, office building, or hotel. In an example embodiment, host computing device 130 can even make predictions about certain characteristics of the user, such as a likely field of employment, based on criteria such as, but not limited to, a home location of user access device 108, travel patterns of user access device 108, and/or a past history of websites visited. These user characteristics can be stored by host computing device 130 as a user profile. Depending upon the level of detail of the received location data, host computing device 130 is configured to determine a probable work, home and vacation locations of user access device 108. Based on this information host computing device 130 is further able to infer user profile characteristics. For example, if a probable "work" location is at or near a university, and a probable "home" location is near a neighborhood in which a large number of students are known to live, then host computing device 130 may determine that user access device 108 is owned by a college student, and accordingly serve to user access device 108 online resource items appropriate to a college student. Alternatively, if host computing device 130 determines that a probable work location is a bank, and that a probable home location is in an affluent neighborhood or condominium, then host computing device 130 may determine that user access device 108 is owned by a person employed in a financial industry and serve online resource items relevant to a person in those circumstances.

As described above, over time, the user device profile generated by host computing device 130 includes data representing patterns of movement of user access device 108 that reflect patterns of behavior of the user associated with user access device 108, wherein the patterns include such details as regular work commuting trips between a home location and a work location, regular trips to identified retail locations such as a grocery, and less frequent but still periodic long-distance trips to other locations, wherein "long-distance" as used herein refers to any distance in excess of a predetermined distance. Such less frequent long distance trips could further be identified as personal or pleasure trips (e.g., visiting relatives or a regular vacation location), if the destination is identified as a residential area. Alternatively, if the destination is identified as a business or industrial area, the trip is classified as probably work-related. In the example embodiment, host computing device 130 includes within the user device profile data representing typical or usual behavior patterns, which enable host computing device 130 to subsequently identify received data representing a trip to an infrequently-visited or never previously-visited location as an outlier. Host computing device 130 uses additional data not directly obtained from user access device 108 as described herein to determine whether the present location of device 108 is associated with a personal trip state or a work-related trip state.

Host computing device 130 further receives location-related data from other sources that facilitates the generation 304 of the user device profile. For example, sender and recipient IP addresses and corresponding times of day associated with a user's email traffic through user access device 108 can provide supplemental information that can confirm home, work and vacation locations previously identified by host computing device 130.

In the example embodiment, generation 304 of the user device profile by host computing device 130 is an ongoing process, in that the user device profile is continuously or periodically (at predetermined intervals) updated by host computing device 130 as new location data is received. In an embodiment, host computing device 130 is configured to periodically reclassify locations, for purposes of determining a state of a user. For example, if received data reflects that user access device 108 has not returned to a designated home location for more than a predetermined period of time, and that received data represents regular stays at time periods at a new location qualifying as a home location, host computing device 130 may declassify the previous home location and designate the new location as a home location. Further information regarding the user can be determined from location data, such as the language likely spoken by the user.

Method 300 continues when host computing device 130 receives 308 an online resource request, e.g., a publication request from user access device 108. In the example embodiment, a publication request is a search query submitted by a user for publications (such as publication request 156 shown in FIG. 1), e.g., via user access device 108 (FIG. 1).

In the example embodiment, host computing device 130 determines 310 a current location of user access device 108, using one or more of the location data receiving mechanisms described hereinabove. Host computing device 130 also determines 310, via the stored user device profile associated with user access device 108, a probable state of the user. As described above, the two most general states of the user are "at home" and "travel." In the example embodiment, the "travel" state can be further broken down into a set of typical or usual travel states, such as a work commute state (which may be further broken down, into home-to-work and work-to-home commute states, as described above), an errand state (e.g., to a grocery), a short trip (e.g., greater than a first predetermined distance but less than a second predetermined distance); a long trip (greater than the second predetermined distance). Moreover, as described above, short and/or long trips can further be classified as being for business or pleasure based upon received data that yields information regarding the nature of the destination, and subsequent activity that follows arrival of the user device at the destination.

Host computing device 130 then receives 312 candidate online resource items, e.g., candidate search results and/or publications responsive to the publication request, for example from publication repository 124 (FIG. 1) or some other source. As used herein, "candidate" refers generally to an online resource item received in response to a request for an online resource item. More specifically, as described hereinbelow, "candidate" can refer to a search result or publication 160 (FIG. 1), or an advertisement 166 (FIG. 1), received in response to a search query, that may be served to user access device 108, after a determination of relevance of the search result, publication, or advertisement, to the state of the user.

In the example embodiment, host computing device 130, based on the previously-identified state of the user, identifies 314 from the candidate search results, those search results and/or publications that are relevant to the identified probable state of the user and serves 316 the identified relevant search results and/or publications to user access device 108 (FIG. 1). As used herein, "relevant" refers to the status of received online resource items that meet various predetermined criteria contained in the user device profile, relative to a determined state of the user. For example, if the state of the user is a "home" state, the predetermined criteria may include distance limitations on online resource items that relate to predicted or requested destinations, like restaurants, retail establishments, or service facilities, like auto repair shops. The online resource items identified by host computing device 130 may be responsive to a resource request received by host computing device 130 that was submitted by the user via user access device 108, submitted from a publisher 104, or received from host computing device 130 itself ("self-generated"). In the example embodiment, to the extent that any of the candidate online resource items includes a location component (e.g., "museums"), host computing device 130 may prioritize the received online resource items in descending order of distance from the current location of user access device 108, such that received online resource items associated with destinations nearer to user access device 108 are presented first, amongst a number of received online resource items.

FIG. 4 is a flowchart illustrating the steps in the example method 400 for serving online content to traveling users, whether in combination with search results in response to a publication search request, or independently of a search request. Method 400 shares many similarities with method 300 described above (shown in FIG. 3). For example, method 400 is initiated when host computing device 130 (shown in FIG. 1) of CMS 106 receives 402 location data from user access device 108 (FIG. 1) regarding movements of user access device 108, such as a computer being accessed by a user 150, a laptop being accessed by a user 152, and or a mobile device being accessed by a user 154 (all shown in FIG. 1). In addition, location data used in method 400 may be obtained through the same sources as described with respect to method 300.

As host computing device 130 receives 402 location data, host computing device 130 also stores the location data (which also includes data regarding points in time associated with geographic locations occupied by user access device 108, shown in FIG. 1), for example in database 146 (FIG. 1). Host computing device 130 then generates 404 a user device profile (as described with respect to method 400 hereinabove) and stores 406 the user device profile, for example in database 146. Alternatively, or in addition to database 146, host computing device 130 may store the user device profile within user access device 108, such as in the form of a cookie.

Moreover, as previously described with respect to method 300, as host computing device 130 continues to receive location data from user access device 108 (FIG. 1), host computing device 130 generates 404 a profile of user access device 108 that includes a set of typical travel locations or destinations, as well as probable states of the user associated with the respective typical travel locations. The data received by host computing device 130 can include further detailed information regarding locations to which user access device 108 (FIG. 1) travels, depending upon the degree of precision provided by the raw location data. Host computing device 130 may also receive location-related data from other sources that facilitates the generation 404 of the user device profile. For example, sender and recipient IP addresses and corresponding times of day associated with a user's email traffic through user access device 108 (FIG. 1) can provide supplemental information that can confirm home, work and vacation locations previously identified by host computing device 130. As described hereinabove, in the example embodiment, generation 404 of the user device profile by host computing device 130 is an ongoing process, in that the user device profile is continuously or periodically (at predetermined intervals) updated by host computing device 130 as new location data is received.

Method 400 continues when host computing device 130 receives 408 a request for online content, for example via a search query or publication request received from user access device 108 (FIG. 1). In the example embodiment, host computing device 130 determines 410 a current location of user access device 108, using one or more of the location data receiving mechanisms described hereinabove. Host computing device 130 also determines 410, via the stored user device profile associated with user access device 108, a probable state of the user. As described above, the two most general states of the user are "at home" and "travel." In the example embodiment, the "travel" state can be further broken down into a set of typical or usual travel states, such as a work commute state, an errand state (e.g., to a grocery), a short trip (e.g., greater than a first predetermined distance but less than a second predetermined distance); a long trip (greater than the second predetermined distance). Moreover, as described above, short and/or long trips can further be classified as being for business or pleasure based upon received data that yields information regarding the nature of the destination, and subsequent activity, following arrival at the destination.

In the example embodiment, host computing device 130 receives 412 candidate search results resulting from a search query received from user access device 108 (FIG. 1), and receives 414 candidate items of online content associated with the search results. That is, as described hereinabove with respect to FIG. 1, candidate publication pages 158 are received by host computing device 130 in response to a publication request 156. In the example embodiment, candidate publication pages 158 include one or more code snippets 162 associated with one or more candidate ads. As described hereinabove, "candidate" refers to a search result, publication, or ad or other item of online content that is received by host computing device 130 that is generally responsive to, or potentially relevant to, a search query, prior to a determination of relevance to the state of the user. Host computing device 130 then identifies 416 from the search results and the associated candidate online content items, one or more items of online content that are relevant to the determined state of the user and serves 418 the identified relevant online content (e.g., ads) to user access device 108. Host computing device 130 may identify ads (both video and/or static) that are for products, services or businesses that are in closest physical proximity to the current location of user access device 108. In addition, having determined whether the user is in a travel-pleasure state or in a travel-business state, host computing device 130 selects for presentation to the user ads that are relevant to either a personal or pleasure traveler (such as sightseeing opportunities) or a business traveler (such as business dining opportunities).

In an example embodiment, host computing device 130 additionally identifies 416 online content items based on past locations and states of the user as embodied in the user device profile. For example, a user in an "at home" state may submit a request related to vacation planning. If the user device profile indicates a past trip to Argentina, host computing device 130 may identify online content items containing information regarding travel opportunities (destination suggestions) to other South American locations as relevant to the user's query. However, if a similar query is submitted by a user while on a trip that host computing device 130 has already identified as a probable pleasure travel trip, host computing device 130 may identify online content items describing other potential vacation destinations within a predetermined distance from the current location of user access device 108 (FIG. 1). Moreover, host computing device 130 may additionally identify or generate a set of driving (or walking) directions from the current location of the user access device 108 to a suggested destination, or a map showing the relative locations of user access device 108 and one or more suggested locations, to be included within the ad served to user access device 108, or as a separate item served to user access device 108.

In the example embodiments, the user search query may be received by host computing device 130 through one of a plurality of platforms, such as a search platform (search engine), an email platform, or a video (or other content) download platform. Accordingly, host computing device 130 can serve the response(s) to the user search query through any of the previously-described platforms. In one embodiment, host computing device 130 additionally receives data from user access device 108 (FIG. 1) representing movements taken by the user in response to query results served to user access device 108. For example, if data is received indicating movement of user access device 108 to a location referred to in a previous query response, within a predetermined period of time following the service of the query response, host computing device 130 records and stores such data as positive feedback representative of a level of correspondence between movements of user access device 108 and the location(s) embodied in the online content item(s) served to the user. The feedback is representative of the relevance of the query response. For example, if the query response was an advertisement, subsequent movement of the user access device 108 to a location provided in the advertisement is representative of the relevance and effectiveness of the particular advertisement, analogous to a report of a conversion of an ad as described herein. Host computing device 130 may subsequently generate and transmit a conversion message to advertiser(s) 102.

In an alternative embodiment, a response served by host computing device 130 to user access device 108 may include an advertisement that host computing device 130 has determined, as described above, as being relevant to the present user state. If the user then submits a request for driving directions to a destination associated with the advertisement, host computing device 130 likewise records and stores data relating to the driving directions request as positive feedback representative of a level of correspondence between the advertisement that was served and the state of the user as determined by host computing device 130. From such feedback data, an advertiser 102 may be able to estimate a level of effectiveness of an advertisement. For example, an advertiser 102 (shown in FIG. 1) may receive feedback data indicating that within a predetermined period of time, a specific advertisement received 10,000 clicks from users, 1000 requests for driving directions from users relative to the advertisement, and that within another period of time following the requests for driving directions, 100 pusers travelled to the destination corresponding to the driving direction request. An advertiser 102 could then use such feedback data to determine appropriate amounts to bid, as described above, for placement of the advertisement, for example bidding a first amount per request for driving directions, and a second, greater amount for each driving direction request that was followed by the requesting user actually travelling to the destination embodied in the driving direction request. In addition, host computing device 130 may also generate and transmit a conversion message to advertiser(s) 102, as described above.

In another embodiment, host computing device 130 may be configured to serve to user access device 108 at least one online resource item that is relevant to a recurring state of the user, whether or not the recurring state of the user happens to also correspond with the current state of the user. For example, a user associated with user access device 108 may engage in certain repeating patterns of activity, for example repeated trips to a recreational activity location (such as a ski resort). Accordingly, in this other embodiment, host computing device 130 receives location data from user access device 108 and generates a profile of user access device 108. Host computing device 130 may be configured to determine, for example, after user access device 108 has travelled a predetermined number of times to a predetermined location that travel, to that predetermined location, corresponds to a predefined "recurring state." Using the skiing example, if host computing device 130 determines that user access device 108 has travelled to locations corresponding to ski resorts more than four times during a single skiing season, then host computing device 130 includes within the profile information that identifies "ski trips" as a recurring state of the user. Accordingly, host computing device 130 may be configured to periodically serve to user access device 108 online resource items that are relevant to recurring states recorded by host computing device 130, without requiring reference to a current state of user access device 108.

Figure 5:
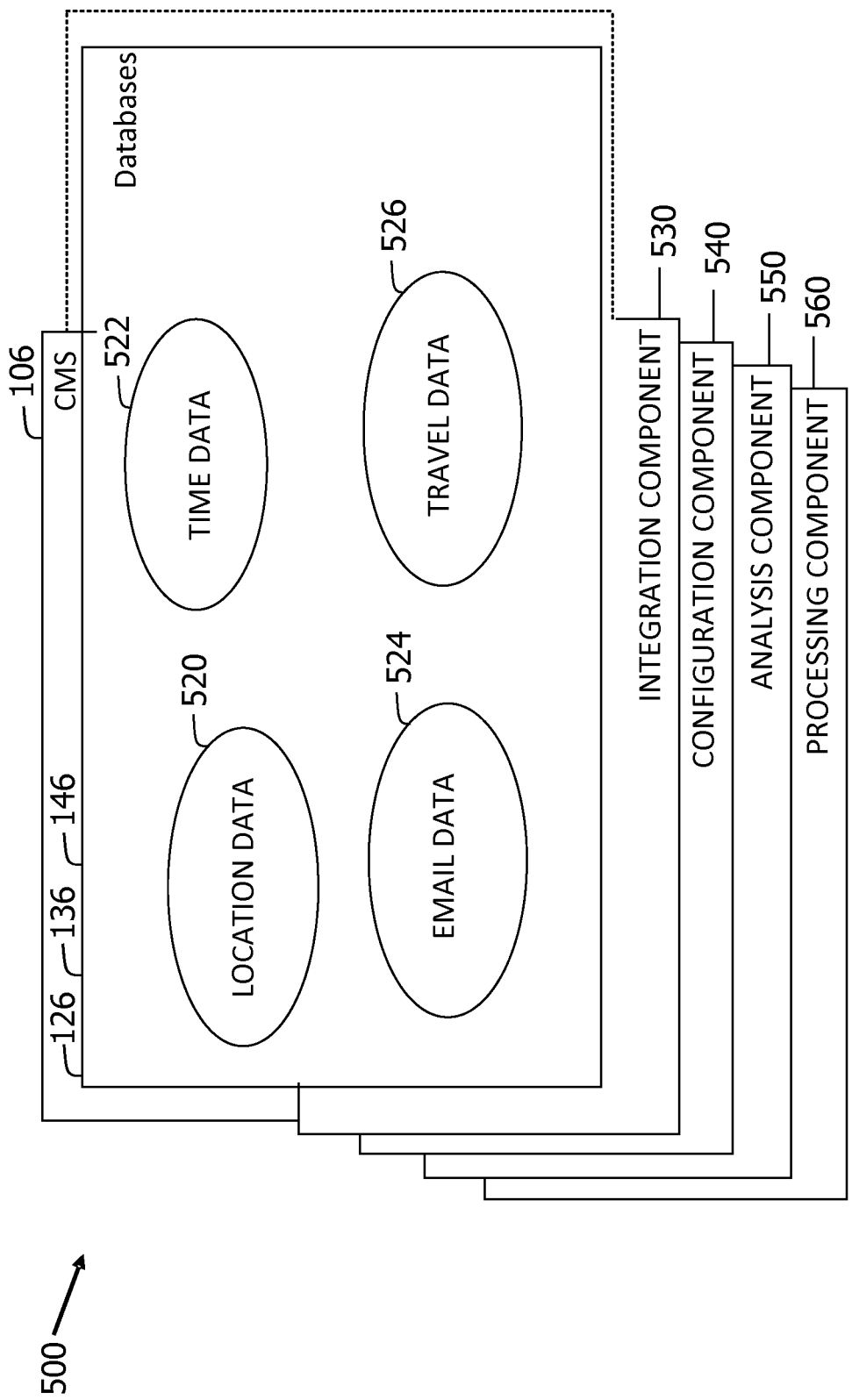
FIG. 5 is a diagram of example components included within the host computing device shown in FIG. 1.

FIG. 5 is a diagram 500 of components of one or more example host computing devices, for example host computing device 130 (shown in FIG. 1), that may be used in the environment shown in FIG. 1, specifically, as part of content management system 106 (shown in FIG. 1), as previously described. FIG. 5 further shows a configuration of databases 126, 136, and 146 (also shown in FIG. 1). Databases 126, 136, and 146 are coupled to several separate components within host computing device 130, which perform specific tasks.

In an example embodiment, one or more of databases 126, 136, and 146 is divided into a plurality of sections, including but not limited to, a location data section 520, a time data section 522, an email data section 524, and a travel data section 526. These sections within databases 126, 136, and 146 are interconnected to retrieve information pertaining to the operations and components described below.

Host computing device 130 includes an integration component 530 for creating associations between movements of a user access device 108 (shown in FIG. 1), using location data 520 and time data 522. Host computing device 130 also includes a configuration component 540 to build a profile of user access device 108. Host computing device 130 also includes an analysis component 550 to determine a current location of user access device 108, a probable state of the user, and identify from received candidate online resource items, publications and/or search results to serve to user access device 108. Host computing device 130 additionally includes a processing component 560 for performing other operations associated with identifying content items that are relevant to a state of a user.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely by way of example, and not mandatory; functions performed by a single system component may instead be performed by multiple components, and functions performed by multiple components may instead performed by a single component. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for serving an online resource item to a user device based at least in part on a state of the user, the method implemented using a host computing device in communication with a memory, said method comprising:
   receiving, at a host computing device, movement data from a user device, the movement data representing a record of movement of the user device over a period of time, the movement data including location data and time data;
   assigning to the user device, by the host computing device, a home location and work location based on the movement data;
   categorizing, by the host computing device, the movement data into a plurality of patterns based on the home location, the work location, and associations between the location data and the time data of the movement data for the user device, wherein each pattern of the plurality of patterns is associated with at least one of a plurality of predefined states of the user;
   generating, by the host computing device, a user device profile for the user device including the plurality of patterns and the associated predefined states of the user;
   storing the user device profile within the memory;
   receiving a resource request associated with the user device;
   determining a current pattern of the user based at least in part on a current location of the user;
   determining, by the host computing device, a current state of the user based at least in part on the user device profile and the current pattern of the user;

receiving, at the host computing device, at least one candidate online resource item responsive to the resource request;

identifying, by the host computing device, from the received at least one candidate online resource item, at least one online resource item relevant to the current state of the user; and serving, from the host computing device, the identified at least one online resource item relevant to the current state of the user to the user device.

2. The method in accordance with claim 1, wherein the at least one candidate online resource item comprises at least one of a search result, a publication, and an advertisement.

3. The method in accordance with claim 1, wherein the current state of the user includes a first state of the user and a recurring state of the user, wherein the first state of the user is based on the current location of the user device and indicates whether the user device is currently at least one of within a typical travel pattern, within an atypical travel pattern, travelling for business, travelling for pleasure, travelling locally for personal reasons, at a home location, at a work location, and at a vacation location, and wherein the recurring state of the user indicates a predetermined frequency of travel by the user device to a specific destination.

4. The method in accordance with claim 1, wherein storing the user device profile within the memory comprises at least one of storing the user device profile within memory associated with the user device, and storing the user device profile within memory associated with the host computing device.

5. The method in accordance with claim 1, wherein the patterns of the user comprise at least a home travel pattern, a work travel pattern, and a vacation travel pattern.

6. The method in accordance with claim 1, wherein serving, from the host computing device, the identified at least one online resource item relevant to the current state of the user comprises at least one of:

serving information responsive to a user search query and the determined current state of the user;

serving a specific publication responsive to a user search query and the determined current state of the user;

serving an online resource item to the user independently of a user search query and responsive to the determined current state of the user; and serving a destination suggestion based on the determined current state of the user, the destination suggestion including at least one of travel directions and a map.

7. The method in accordance with claim 1, further comprising:

receiving, by the host computing device, data representing a record of movements of a user device after service of the identified at least one online resource item relevant to the current state of the user;

comparing, by the host computing device, the record of movements after service of the identified at least one online resource item to a location embodied in the served at least one online resource item; and generating, by the host computing device, a feedback signal representative of a level of correspondence between the record of movements after service of the served at least one online resource item and the location embodied in the at least one online resource item.

8. The method in accordance with claim 7, wherein the identified at least one online resource item is an advertisement, said method further comprising:

determining, by the host computing device, whether the level of correspondence exceeds a predetermined level;

generating, by the host computing device, a conversion message that contains data representing the advertisement, if the level of correspondence exceeds the predetermined level; and transmitting the conversion message to an advertiser.

9. The method in accordance with claim 1, wherein the at least one online resource item is an advertisement, said method further comprising:

receiving, by the host computing device, data representing a request by the user device for driving directions to a destination associated with the advertisement;

generating, by the host computing device, a conversion message that contains the data representing the driving directions request; and transmitting the conversion message to an advertiser.

10. The method in accordance with claim 1, wherein generating a user device profile further comprises deriving location data of the user device from email data associated with the user device.

11. The method in accordance with claim 1, wherein receiving, by the host computing device, movement data from a user device comprises receiving location data regarding the user device via at least one of an Internet Protocol address, Global Positioning system data, Wi-Fi signal strength, cell tower signal strength, and telecommunications triangulation data.

12. A computer system for serving an online resource item to a user device based at least in part on a state of the user, said computer system comprising:

a processor; and a computer-readable storage device having encoded thereon computer-readable instructions that are executable by the processor to perform functions comprising:

receiving movement data from a user device, the movement data representing a record of movement of the user device over a period of time, the movement data including location data and time data;

assigning to the user device a home location and work location based on the movement data;

categorizing the movement data into a plurality of patterns based on the home location, the work location, and associations between the location data and the time data of the movement data for the user device, wherein each pattern of the plurality of patterns is associated with at least one of a plurality of predefined states of the user;

generating a user device profile for the user device including the the plurality of patterns and the associated predefined states of the user;

storing the user device profile within a memory;

receiving a resource request associated with the user device;

determining a current pattern of the user based at least in part on a current location of the user;

determining a current state of the user based at least in part on the user device profile and the current pattern of the user;

receiving at least one candidate online resource item responsive to the resource request;

identifying, from the received at least one candidate online resource item, at least one online resource item relevant to the current state of the user; and serving the identified at least one online resource item relevant to the current state of the user to the user device.

13. The computer system in accordance with claim 12, wherein the at least one online resource item served includes at least one of:

information responsive to a user search query and the determined current state of the user;
a specific publication responsive to a user search query and the determined current state of the user;
an online resource item received independently of a user search query and responsive to the determined current state of the user;
a destination suggestion based on the determined current state of the user, the destination suggestion including at least one of travel directions and a map; and
an advertisement.

14. The computer system in accordance with claim 12, wherein the computer-executable instructions cause the processor to:
receive data representing a record of movements of a user device after service of the identified at least one online resource item relevant to the current state of the user;
compare the record of movements after service of the identified at least one online resource item to a location embodied in the served at least one online resource item; and
generate a feedback signal representative of a level of correspondence between the record of movements after service of the served at least one online resource item and the location embodied in the at least one online resource item.

15. The computer system in accordance with claim 14, wherein the identified at least one online resource item is an advertisement, and wherein the computer-executable instructions cause the processor to:
determine whether the level of correspondence exceeds a predetermined level;
generate a conversion message that contains data representing the advertisement, if the level of correspondence exceeds the predetermined level; and
transmit the conversion message to an advertiser.

16. The computer system in accordance with claim 14, wherein the identified at least one online resource item is an advertisement, and wherein the computer-executable instructions cause the processor to:
receive data representing a request by the user device for driving directions to a destination associated with the advertisement;
generate a conversion message that contains the data representing the driving directions request; and
transmit the conversion message to an advertiser.

17. The computer system in accordance with claim 12, wherein the computer-executable instructions cause the processor to derive location data from email data.

18. The computer system in accordance with claim 12, wherein the computer-executable instructions cause the processor to receive location data regarding the user device via at least one of an Internet Protocol address, Global Positioning system data, Wi-Fi signal strength, cell tower signal strength, and telecommunications triangulation data.

19. Non-transitory computer readable storage media having computer-executable instructions thereon for serving an online resource item to a user device based at least in part on a state of the user, wherein when executed by at least one processor, the computer-executable instructions cause the at least one processor to:
receive movement data from a user device, the movement data representing a record of movement of the user device over a period of time, the movement data including location data and time data;
assign to the user device a home location and work location based on the movement data;
categorize the movement data into a plurality of patterns based on the home location, the work location, and associations between the location data and the time data of the movement data for the user device, wherein each pattern of the plurality of patterns is associated with at least one of a plurality of predefined states of the user;
generate a user device profile for the user device including the the plurality of patterns and the associated predefined states of the user;
store the user device profile within a memory;
receive a resource request associated with the user device;
determine a current pattern of the user based at least in part on a current location of the user;
determine a current state of the user based at least in part on the user device profile and the current pattern of the user;
receive at least one candidate online resource item responsive to the resource request;
identify from the at least one candidate online resource item, at least one online resource item relevant to the current state of the user; and
serve the identified at least one online resource item relevant to the current state of the user to the user device.

20. The non-transitory computer-readable storage media in accordance with claim 19, wherein the computer-executable instructions cause the at least one processor to:
receive data representing a record of movements of the user device after service of the identified at least one online resource item relevant to the state of the user;
compare the record of movements after service of the identified at least one online resource item to a location embodied in the served at least one online resource item; and
generate a feedback signal representative of a level of correspondence between the record of movements after service of the served at least one online resource item and the location embodied in the served at least one online resource item.

21. The non-transitory computer-readable storage media in accordance with claim 19, wherein the computer-executable instructions cause the at least one processor to serve the at least one online resource item including at least one of:
information responsive to a user search query;
a specific publication responsive to a user search query and the determined state of the user;
an online resource item received independently of a user search query and responsive to the determined state of the user;
a destination suggestion based on the determined state of the user, the destination suggestion including at least one of travel directions and a map; and
an advertisement.

22. The non-transitory computer-readable storage media in accordance with claim 19, wherein the at least one online resource item is an advertisement that includes a link to travel directions to a destination associated with the advertisement, wherein the computer-executable instructions cause the processor to:
receive data representing a record of movements of a user device after the user clicks on the travel directions link;
compare the record of movements subsequent to the user click on the travel directions link; and
generate a feedback signal representative of a level of correspondence between the record of movements subsequent to the user click on the travel directions link and the destination embodied in the travel directions link.

23. The non-transitory computer-readable storage media in accordance with claim 19, wherein the computer-executable instructions cause the at least one processor to serve the at least one resource item through at least one of a video viewing platform, a search platform, and an email platform.

* * * * *